United States Patent
Willkie et al.

(10) Patent No.: US 6,683,851 B1
(45) Date of Patent: Jan. 27, 2004

(54) FLOW CONTROL OF MULTIPLE ENTITIES SHARING A COMMON DATA LINK

(75) Inventors: James J. Willkie, Poway, CA (US); Clifton Eugene Scott, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/480,696

(22) Filed: Jan. 5, 2000

(51) Int. Cl.[7] .......................... G06F 15/16; H04L 12/56
(52) U.S. Cl. ...................... 370/235; 370/522; 709/232; 455/445; 710/29
(58) Field of Search .................. 370/229, 235, 370/236, 338, 320, 428, 412, 413, 522, 528, 420, 421, 463, 476, 474; 709/232, 234, 235, 238; 455/445, 453; 710/29, 30, 33, 52

(56) References Cited

U.S. PATENT DOCUMENTS

| | | | |
|---|---|---|---|
| 5,790,770 A | * | 8/1998 | McClure et al. ............ 709/231 |
| 5,822,300 A | * | 10/1998 | Johnson et al. ............ 370/229 |
| 6,021,115 A | * | 2/2000 | Simpson et al. ............ 370/235 |
| 6,104,749 A | * | 8/2000 | Lu et al. ...................... 370/235 |
| 6,192,422 B1 | * | 2/2001 | Daines et al. ................. 710/29 |

* cited by examiner

*Primary Examiner*—Chi Pham
*Assistant Examiner*—Afsar M. Qureshi
(74) *Attorney, Agent, or Firm*—Philip R. Wadsworth; Charles D. Brown; Kevin T. Cheatham (57) ABSTRACT

A QMIP unit receives and stores data information from a first set of modules. The QMIP unit also receives and stores a flow control indication from each module of a first set of modules. The flow control indication is indicative as to whether each module of the first set of modules is capable of receiving data. The QMIP unit creates a frame which carries the data information and the flow control indication corresponding to one of the first set of modules. The QMIP unit forwards the frame over the common data link. At the far end of the data link, the receiving QMIP unit parses the flow control indication and the data information from the frame and forwards the flow control indication and the data information to a destination module. The destination module processes the data according to normal procedures. In addition, the destination module responds to the flow control indication by ceasing the transmission of data to the sending module if so indicated.

6 Claims, 6 Drawing Sheets

FLOW CONTROL OF MULTIPLE ENTITIES SHARING A COMMON DATA LINK

BACKGROUND OF THE INVENTION

I. Field of the Invention

The invention relates to communication systems. More particularly, the invention relates to communication of digital data over a shared link.

II. Description of the Related Art

Figure 1:
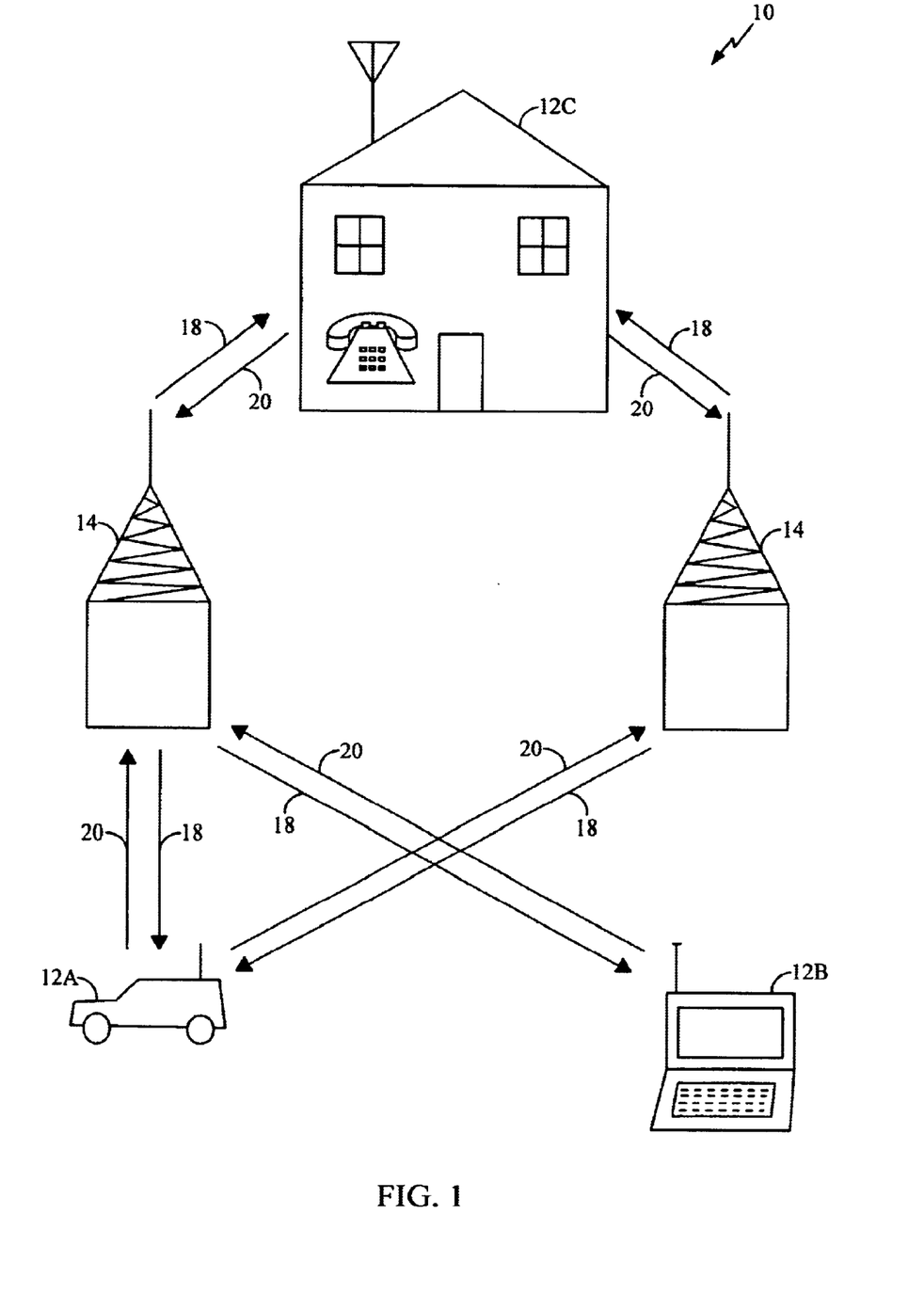
FIG. 1 is an exemplary embodiment of a terrestrial wireless communication system.

FIG. 1 is an exemplifying embodiment of a terrestrial wireless communication system 10. FIG. 1 shows three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows the portable computer remote unit 12B and the fixed location remote unit 12C such as might be found in a wireless local loop or meter reading system. In the most general embodiment, the remote units may be any type of communication unit. For example, the remote units can be hand-held personal communication system (PCS) units, portable data units such as a personal data assistant, or fixed location data units such as meter reading equipment. FIG. 1 shows a forward link signal 18 from the base stations 14 to the remote units 12 and a reverse link signal 20 from the remote units 12 to the base stations 14.

In the discussion that follows, to aid in illustration, the invention is described with reference to a commonly known, wireless link industry standard and the accompanying data standards which have been developed for use in conjunction with that standard. In fact, the generic principles of the invention can be directly applied to many environments. The discussion that follows assumes operation in accordance with the system described in TIA/EIA/IS-95-A published by the Telephone Industry Association entitled "Mobile Station-Base Station Compatibility Standard for Dual-Mode Wideband Spread Spectrum Cellular System" commonly referred to as IS-95.

In addition, a family of data transmission standards compatible with IS-95 have been adopted to provide data services over a wireless link. Examples of data services are FAX, digital file transfer, network access, standard modem functions and the like. An early standard is described in TIA/EIA/IS-99 entitled "Data Services Option Standard for Wideband Spread Spectrum Digital Cellular System." Another more recent standard is described in TIA/EIA/IS-707 entitled "Data Service Options for Spread Spectrum Systems." The IS-99 and IS-707 define radio link protocols which allow the remote unit to emulate standard modem functions. In addition to these two standards, TIA/EIA/IS-657 entitled "Packet Data Services Option for Wideband Spread Spectrum Systems" defines a radio link protocol which allows the remote unit to pass packetized data over the wireless link.

Figure 2:
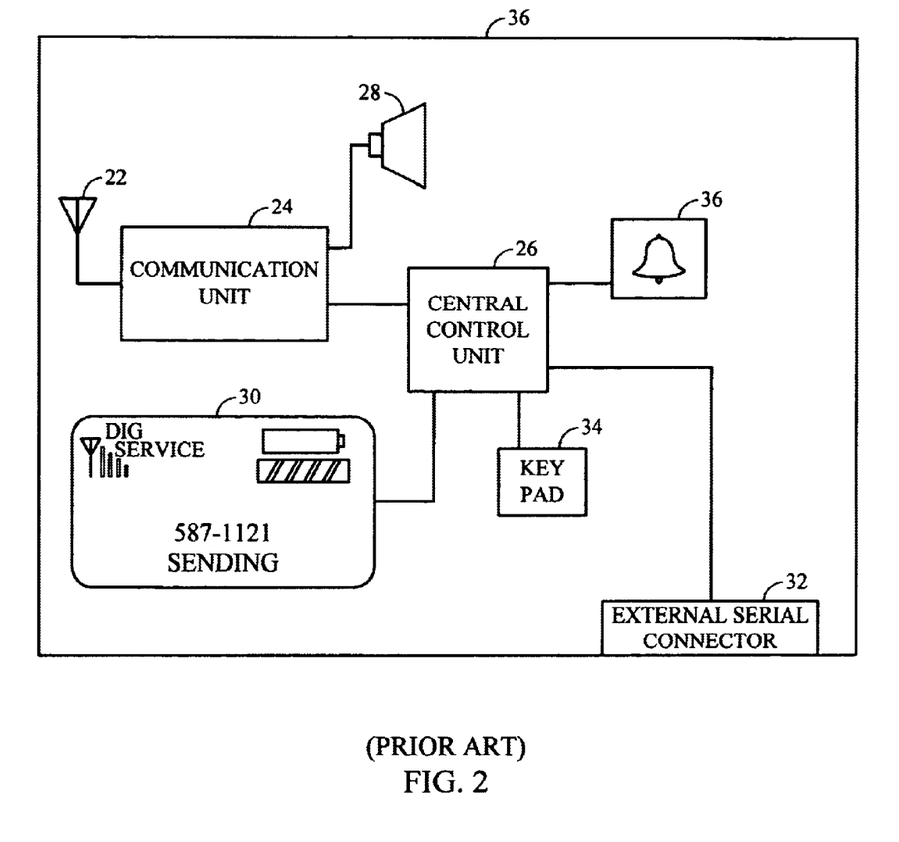
FIG. 2 is a block diagram of a standard remote unit which comprises voice and data functionality.

FIG. 2 is a block diagram of a standard remote unit 36 which comprises voice and data functionality. A central control unit 26 controls all of the functions needed for wireless voice and data services in addition to personal interface management (PIM), such as voice recording and play back. For example, the central control unit 26 may receive a telephone number entered by a user via a keypad 34 and command a communication unit 24 to establish a voice call to that telephone number.

The communication unit 24 provides the actual wireless voice and wireless data access capability in addition to other inherent functions such as voice playback, translation of wireless voice data to digital format for storage by the central control unit 26 and indications of wireless access status. In one embodiment, the communication unit 24 communicates with a base station according to IS-95. The communication unit 24 exchanges audio signals with a earpiece/microphone unit 28.

A display 30 is used to provide visual information to the remote unit user. The central control unit 26 passes information received from both the keypad 34 and the communication unit 24 to the display 30. For example, the central control unit 26 receives information about the current signal level received from the base station and passes the information to the display 30 where it is displayed for the user—whether or not a wireless channel has been established. In addition, the central control unit 26 passes information concerning the current wireless status to the display 30 during a call. For example, the display 30 may indicate that the channel is connected, disconnected or in the process of being connected. When an incoming call is detected by the communication unit 24, the central control unit 26 enables a ringer 36 to alert the user.

In one embodiment, the central process 26 passes digital data between the communication unit 24 and an external source (not shown) directly. The transfer of data to and from the external source is accomplished by way of a external serial connector 32. For example, a lap top or personal computer running a data service or a diagnostic monitor may be attached to the remote unit 36 via the external serial connector 32. In another embodiment, the central control unit 26 passes serial data directly to and from a lap top or personal computer without involvement from the communication unit 24.

In addition to cellular phones, other forms of portable electronics have become prevalent in the business and personal sectors. One device which is becoming increasingly popular is the personal data assistant (PDA). A PDA is like a miniature palm-held computer which allows the user to perform basic computer functions such as word processing, scheduling, spreadsheets and other such functions.

In order to increase the utility of a PDA, wireless functionality has been introduced to the PDA. When PDA and wireless functions are combined into a single unit having a common palm-sized casing, the resulting unit is referred to as a smartphone. A smartphone may send and retrieve e-mail, access the Internet, act as a pager and cellular telephone and provide many other wireless functions.

When the functionality of a remote unit is combined with the functionality of a PDA, typically a single display is used to provide information concerning the wireless link and concerning the operations of the PDA. For example, the same screen which is used to display the dialed digits and the received signal strength is also used to display e-mail messages and soft key functions. Therefore, the central processor in the remote unit must communicate with a central processor of the PDA to provide such information for display. In addition to wireless status, other functionality in the smartphone may require the transfer of information between the two portions of the smartphone. For example, the smartphone may incorporate an answering machine or voice-memo function. The digital voice samples may be stored in memory associated with the PDA portion of the smartphone. The samples are passed to the remote unit portion of the smartphone when accessed by the user so that the vocoder and speaker portion of the remote unit may be used to replay the message. In a like manner, when an incoming message is recorded, digital voice samples must be passed from the remote unit portion of the smartphone to the PDA portion.

When building a remote unit module for integration into a smartphone, it is advantageous to avoid extensive modification of the existing remote unit design. In this way, development costs as well as on-going production costs may be reduced due to economies of scale.

When an electronic device is designed such that a first plurality of modules communicate with a second plurality of modules over a common data link, some means of controlling the flow of data and regulating access to the common data link must be used. In some environments, it is advantageous if the modules themselves operate transparent to the use of the common data link. For example, the modules may be designed as part of an application specific integrated circuit (ASIC) which is configured to be directly connected to a set of modules rather than connected over a common data link. In order to avoid re-designing the ASIC to operate over a common data link, it is advantageous if the modules themselves operate in the same manner as if a direct connection existed.

However, a problem is encountered when an attempt is made to use the available digital connector on a remote unit to transfer more than one type of information. For example, referring again to FIG. 2, when IS-99 FAX data is being received and passed over the external serial connector 32, the protocol used to transfer the data assumes a dedicated link over the external serial connector 32. In particular, the protocol used assumes that all information is passed to a common destination. If during the transfer of an IS-99 FAX, the remote unit has updated wireless status information for the display, no means exists to transfer the information over the external serial connector 32 during the IS-99 FAX transfer because the IS-99 transfer preempts the transfer of any other type of data.

Therefore, there is a need in the art for a means of transferring data between multiple entities over a single serial link. The invention fulfills this need in an efficient manner.

SUMMARY OF THE INVENTION

One embodiment of the invention comprises a method of communicating between multiple entities over a common data link using a QUALCOMM multiplex interface protocol (QMIP) unit. The QMIP unit receives and stores data information from a first set of modules. For example, the first set of modules can be functional modules within a wireless access unit or they can be application modules within a smartphone. In one embodiment, the QMIP unit comprises a memory configured to be a queue which stores an indication of the module and the information. The QMIP unit also receives and stores a flow control indication from each module of a first set of modules. The flow control indication is indicative as to whether each module of the first set of modules is capable of receiving data. For example, if the entity communicating with the module from the far side of the common data link has filled the data input queue of the module, the module sets the flow control indication to signal the far-side entity to cease the transmission of data to the module. The QMIP unit creates a frame which carries the data information and the flow control indication corresponding to one of the first set of modules. The QMIP unit forwards the frame over the common data link.

At the far end of the data link, the receiving QMIP unit receives the frame and parses the flow control indication and the data information from the frame. The receiving QMIP forwards the flow control indication and the data information to a destination module. The destination module processes the data according to normal procedures. In addition, the destination module responds to the flow control indication by ceasing the transmission of data to the sending module if so indicated.

In a general embodiment of the invention, a digital apparatus has a first set of modules. Each module has a data input, a data output and a flow control output. Each module is configured to provide a flow control indication at the flow control output if unable to accept additional data at the data input.

A first connection module, such as the QMIP unit, has a transmission input coupled to the data output of each module of the first set of modules. The first connection module also has a flow control input coupled to the flow control output of each module of the first set of modules. The first connection unit also has a transmission output. The first connection module is configured to receive information from the transmission input and to create a frame comprising the information and the flow control indication corresponding to one of the first set of modules. The first connection unit produces the frame on the transmission output.

A common data link connects the first connection module to a second connection module. The common data link has a first input coupled to the transmission output of the first connection module and has a first output. The common data link is configured to pass the frame from the first input to the first output.

The second connection module has a reception input coupled to the first output of the common data link and has a flow control output and a data output. The second connection module is configured to parse the frame and to pass the flow control indication and the information to an intended module from a second set of modules from the flow control output and the data output, respectively.

BRIEF DESCRIPTION OF THE DRAWINGS

The features, objectives, and advantages of the invention will become more apparent from the detailed description set forth below when taken in conjunction with the drawing.

DETAILED DESCRIPTION OF THE INVENTION

The invention is described herein with reference to a wireless telecommunication environment in order to illustrate the basic principles of the invention. However, the invention has broad applicability to a variety of situations in which a data link is used to transfer data between a plurality of entities.

Figure 3:
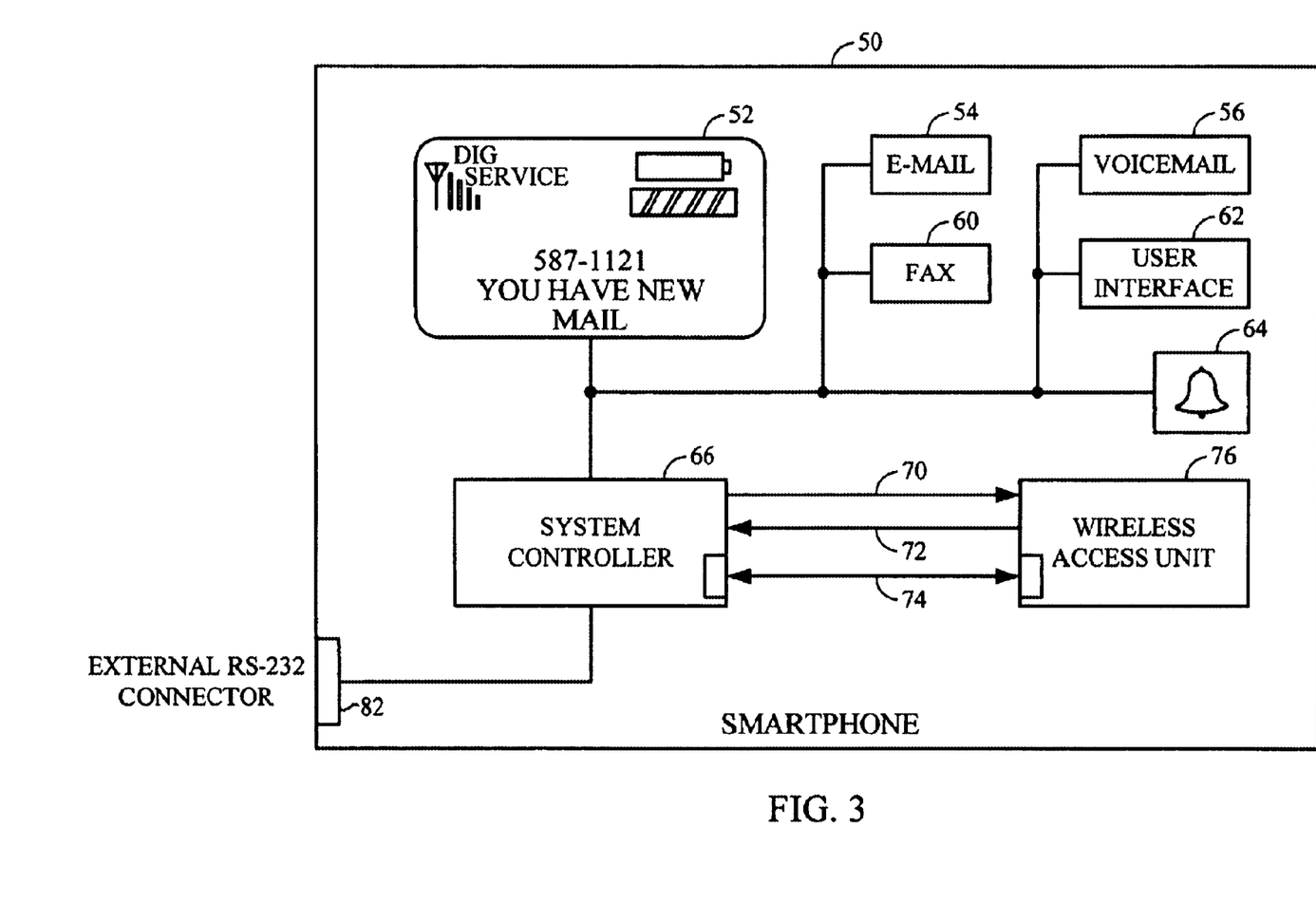
FIG. 3 is a block diagram showing a standard configuration for a smartphone.

FIG. 3 is a block diagram showing a standard configuration for a smartphone 50. The smartphone 50 is comprised of a wireless access unit 76 which performs wireless functions and a number of other elements which support the functions of a personal data assistant. In one embodiment, the wireless access unit 76 comprises an antenna, a central control unit and an earpiece/microphone unit. Among other functions, the wireless access unit 76 performs the over-the-air operations, the processing of requests for origination and detection of incoming voice, data and test mode calls, wireless status monitoring, short message handling (such as IS-637 paging messages), IS-99, IS-657 and IS-707 data services functions, diagnostic functions and audio control for the earpiece and microphone. Therefore, if a voice signal is received over the wireless link, the wireless access unit 76 processes the signal and outputs an audible signal for the smartphone user. If a digital data signal is received over the wireless link, the wireless access unit 76 passes the received data over a data link such as a serial link 74. In another embodiment, the data link may be a parallel link or other type of data bus.

In addition to the digital data information, the wireless access unit 76 provides wireless link status information and diagnostic information to a system controller 66 over the serial link 74. The system controller 66 acts as an interface between the wireless access unit 76 and the remainder of the smartphone 50. For example, when an incoming call is detected by the wireless access unit 76, it passes a ring indication over the serial link 74 to the system controller 66. The system controller 66 passes the ring indication to a ringer 64. The ringer 64 attempts to alert the smartphone user such as by producing an audible sound, or a vibration. If the user answers the incoming call, the system controller 66 passes an off-hook indication to the wireless access unit 76 over the serial link 74.

If a digital data call is received, the wireless access unit 76 passes the digital information over the serial link 74. If the digital information is FAX data or other serial data stream such as IS-707.4 compliant data, the information is routed to a serial data handling entity such as FAX 60. If the information is an e-mail message or other packetized data stream such as IS-707.5 compliant data, the information is routed to a packet data handling entity such as e-mail module 54.

When the smartphone user wishes to place an outgoing voice call, he may enter a number of digits using a user interface 62. The user interface 62 may be a standard key board, a soft-key system, a mouse, a touch screen system which works in conjunction with a display 52 or any other means by which the user may pass information to the smartphone 50. The system controller 66 passes the dialed digits to the wireless access unit 76 within a command to initiate a telephone call.

The wireless access unit 76 passes information concerning wireless status to the system controller 66. The system controller 66 passes some of the information to the display 52 where it is displayed for the user. For example, smartphones typically display an indication of the current received signal strength being received from the base station by the wireless access unit 76. This information is passed repeatedly from the wireless access unit 76 to the system controller 66 and to the display 52 even during an active call.

In one embodiment, the smartphone 50 also comprises a voice mail function 56. If a voice call is received through the wireless access unit 76 and the user is not available to answer the call, the smartphone 50 may record a message for later retrieval by the user. The wireless access unit 76 receives digital voice samples over the wireless link. Instead of decoding the digital voice signals and outputting audio signals over an earpiece, the wireless access unit 76 passes the digital voice samples over the serial link 74 to the system unit controller 66. The system controller 66 forwards the digital voice samples to a memory storage location within the voice mail function 56. When the user retrieves the voice mail, the system unit controller 66 passes the digital voice samples from the voice mail function 56 to the wireless access unit 76 over the serial link 74. The wireless access unit 76 decodes the stored voice samples and outputs the resultant signal over the earpiece.

The smartphone 50 may connect to an external data source such as if the smartphone is placed in a dock and connected to a computer. In this case, information may be passed over an external connector 82. For example, a wireless connection may communicate serial data or packetized data between an externally connected component and a base station. Digital data is received from the external connector 82 and passed to the system controller 66. The system controller 66 passes the information over the serial link 74 to the wireless access unit 76 for transmission over the wireless link. An analogous reverse path is also established.

Figure 4:
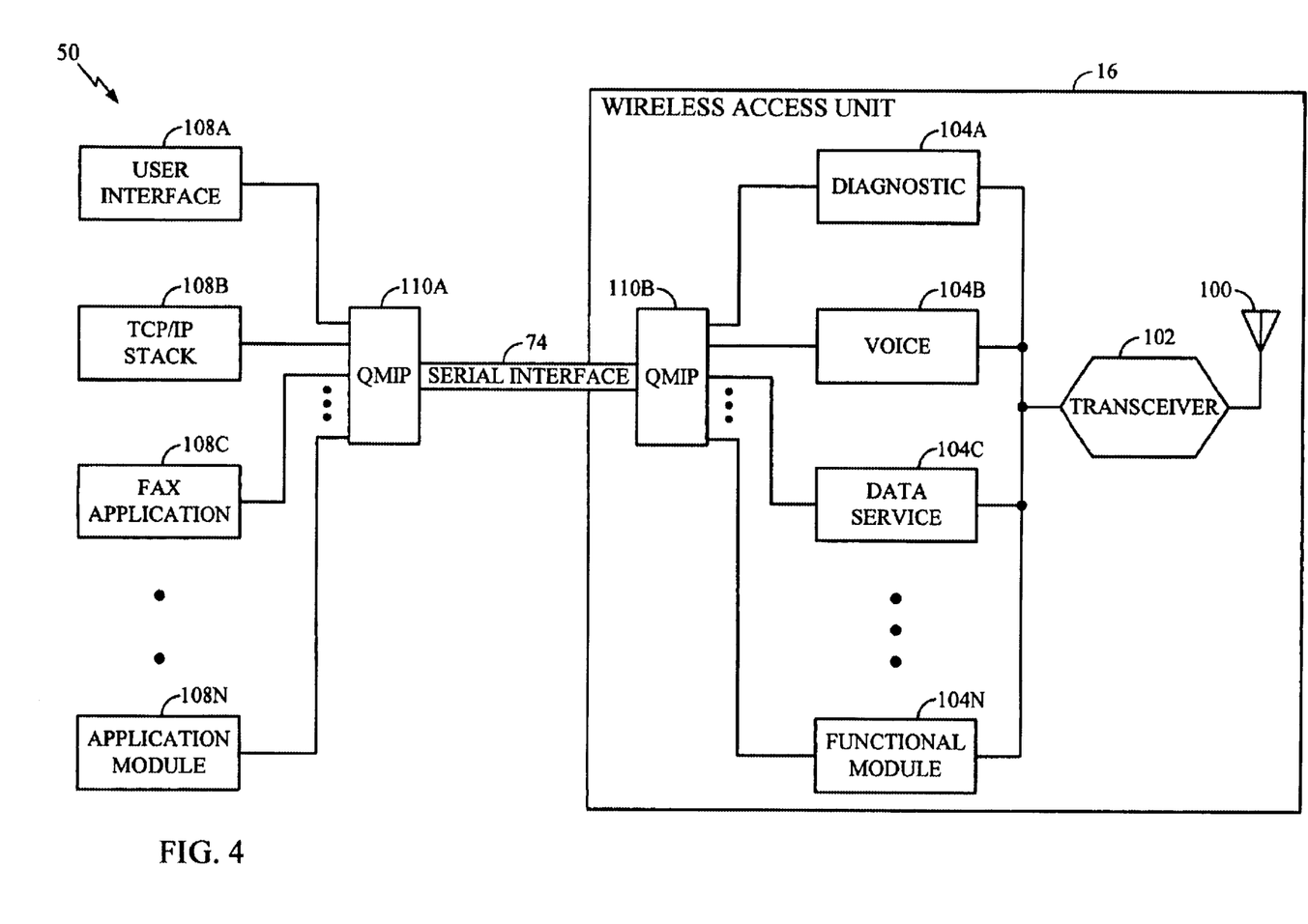
FIG. 4 is a block diagram representatively illustrating the functional and applicational modules within a smartphone.

FIG. 4 is a block diagram functionally illustrating the operation of the smartphone 50. The wireless access unit 76 is shown to have an antenna 100, a transceiver 102 and various functional modules 104A through 104N. For example, the diagnostic functional module 104A provides diagnostic functionality such as monitoring current signal strengths. The voice functional module 104B provides vocoding and other functions associated with the transmission and reception of audio signals. The data services functional module 104C provides data services functions as described above. The wireless access unit can comprise other functional modules as represented by functional module 104N.

When integrating the wireless access unit 76 into a smartphone 50, it is advantageous that the functional modules 104A–104N operate in the same manner as if the wireless access unit 76 were the main component of a standard telephone unit. In this way, the wireless access unit. 76 is truly modular and can be used to implement wireless functions for a variety of different equipment. In other words, it is advantageous if the coupling of the remainder of the smartphone 50 is transparent to the functional modules 104A–104N.

An issue arises when one or more of the functional modules 104A–104N are operating contemporaneously. In general, several of the functional modules 104A–104N operate contemporaneously in standard operation. For example, typically the diagnostic functional module 104A operates continually whether or not one or more of the other functional modules is operating. In addition, it is common for the voice functional module 104B to operate at the same time as one or more of the data functional modules so that a user may use the smartphone 50 as a telephone while continuing to transmit fax information or to receive an e-mail message, for example. In a simple telephone unit, each of the functional modules 104A–104N is directly coupled to a corresponding application module 108A–108N. However, as noted above, in the case of the wireless access unit 76 within the smartphone 50, the functional modules 104A–104N interface with the other components of the smartphone 50 through the shared serial interface 74, also shown in FIG. 4.

In addition to the wireless access unit 76, the smartphone 50 contains the application modules 108A–108N. For example, the user interface application module 108A receives input from the human user of the smartphone 50. The TCP/IP stack application module 108B operates the web browser or e-mail applications on the smartphone 50. The fax application module 108C transmits and receives fax information. Likewise, the smartphone 50 may contain other application modules as represented by the application module 108N. Some means of multiplexing communication over the serial interface 74 is needed to facilitate communication between the application modules and functional modules. In FIG. 4, the functional modules 104A–104N and the application modules 108A–108N can be thought of as logical or virtual circuits. In one embodiment, each of these modules represents a portion of software, hardware including general purpose circuits as well as application-specific circuits, and firmware.

Typically, the wireless link is not capable of transmitting data as quickly as it can be transferred over the serial interface 74. For example, if the TCP/IP stack application module 108B is forwarding an e-mail message for transmission over the wireless link, the TCP/IP stack application module 108B can transmit data over the serial interface 74 to the functional module 104C at a faster rate than the data services functional module 104C can forward the data over the wireless link via the transceiver 102 and the antenna 100. For this reason, some means of flow control over the serial interface 74 is necessary in order to avoid overflowing the memory storage capability of the data service functional module 104C. The flow control process must take place on a module-by-module basis.

Therefore, on each side of the serial interface 74, a QUALCOMM multiplex interface protocol (QMIP) unit 110 is used to regulate access to the serial interface 74 and to provide flow control. The QMIP units 110A and 110B on either side of the serial interface 74 operate in the same manner. In the discussions that follow, the operation of passing information from the QMIP unit 110B to the QMIP 110A is described. It is to be understood that the reverse process operates in the same manner. The QMIP 110 can be implemented as a microprocessor and associated memory, as one or more software modules or a combination of these.

In one embodiment, the QMIP unit 110B is designed to use most standard data terminal equipment/data communication equipment (DTE/DCE) interfaces such as EIA-232, EIA-422, EIA-423, universal serial bus (USB) as well as a shared memory or inter-process message queuing. Only receive and transmit data signals are passed over the serial interface 74. Other signals such as data terminal ready (DTR) and data set ready (DSR), data carrier detect (DCD), request to send (RTS) and clear to send (CTS) can be supported. Hardware flow control can also be supported if available. The software flow control is provided on a virtual circuit basis as discussed below with respect to FIG. 5, but hardware flow control shall suspend traffic on the serial interface 74 if asserted for all virtual circuits.

Figure 5:
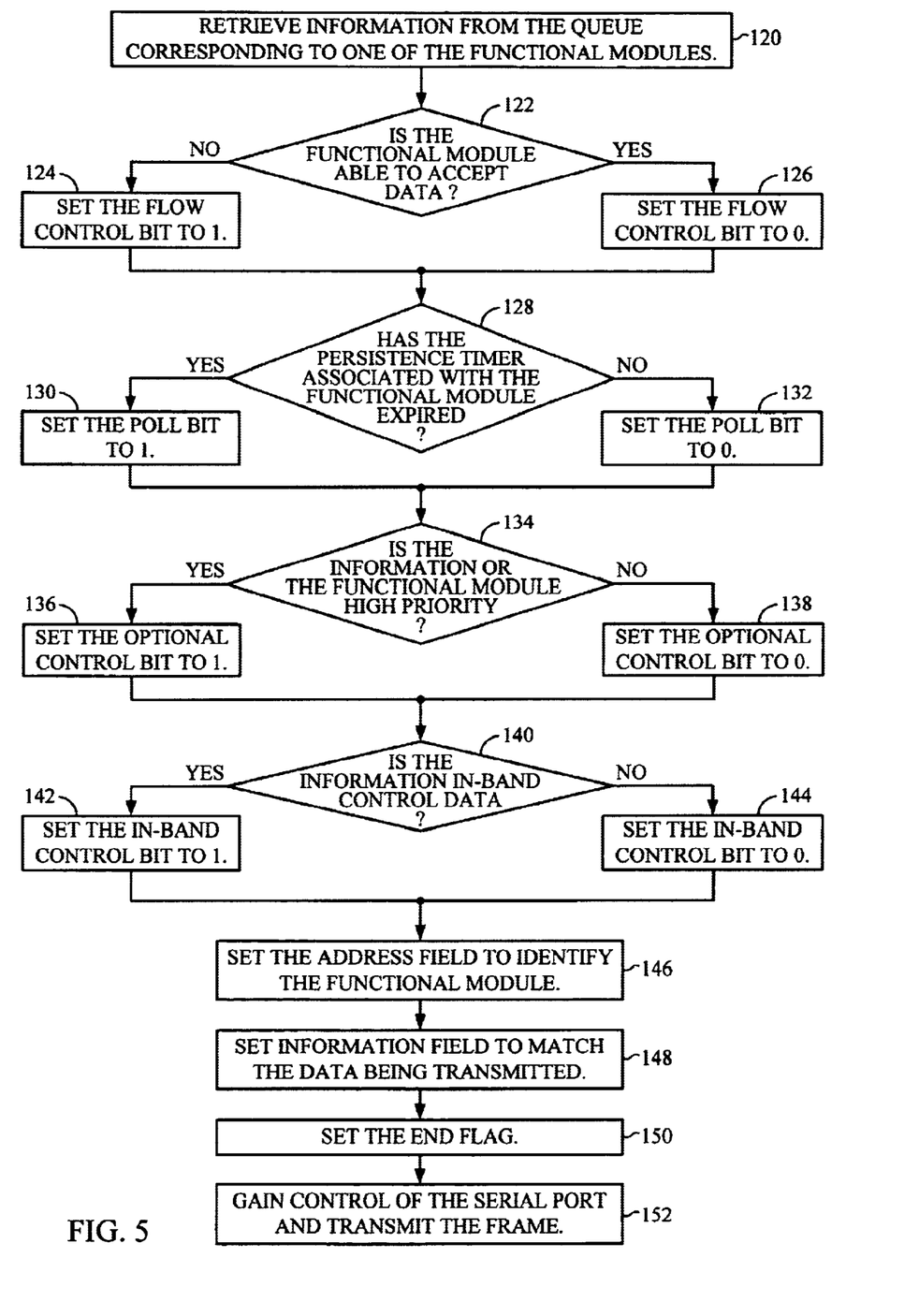
FIG. 5 is a flowchart showing the operation of the QMIP unit.
Figure 6:
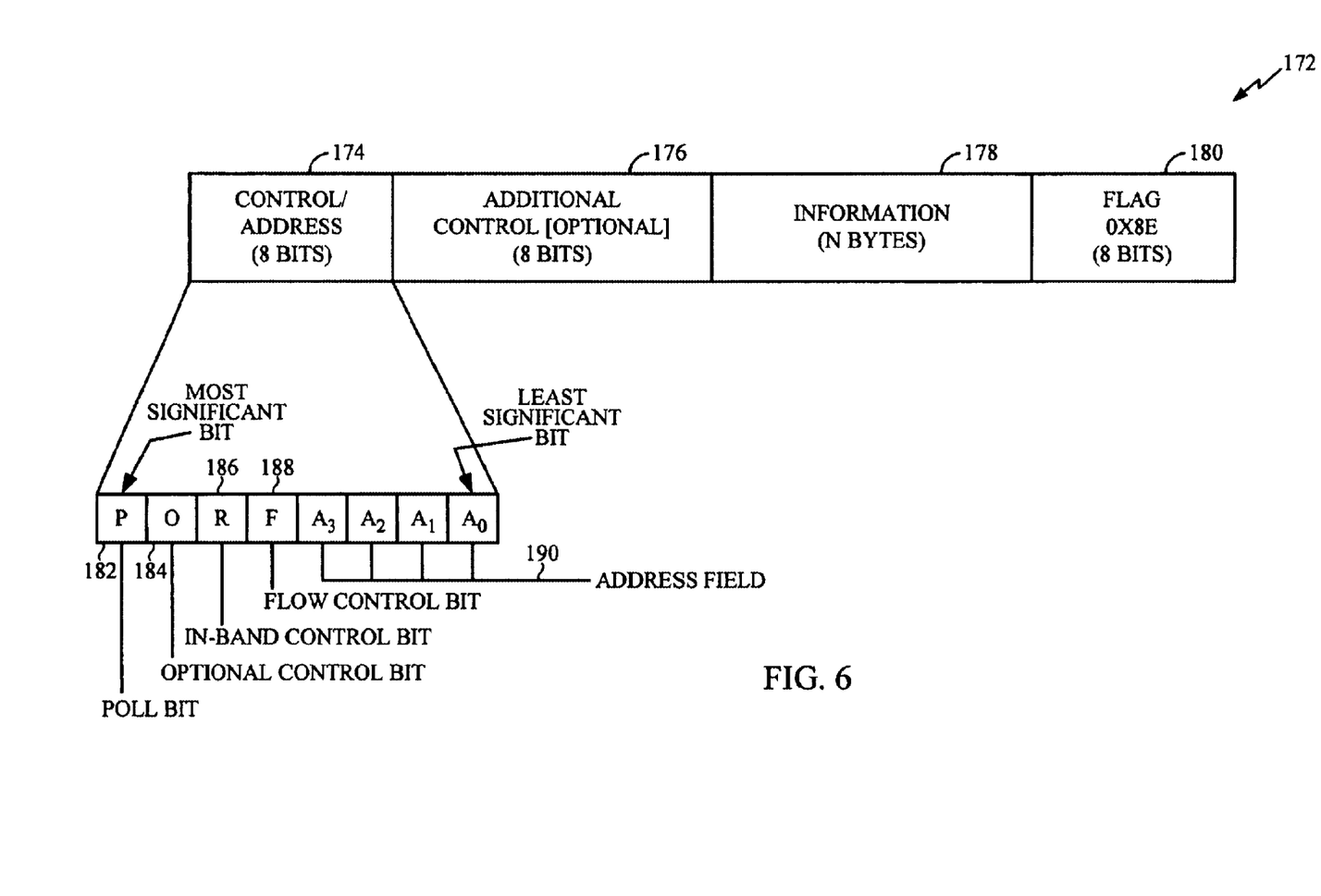
FIG. 6 is a representative drawing showing the elements of an exemplifying frame created by the QMIP.

FIG. 5 is a flowchart showing the operation of the QMIP unit 110B as it creates a QMIP frame. The functions described in FIG. 5 are used to develop a frame for transmission over the serial interface 74. FIG. 6 is a representative drawing showing the elements of an exemplifying frame format used by the QMIP 110B. FIG. 6 is used below to aid in illustration of the functions shown in FIG. 5. A frame 172 shown in FIG. 6 is comprised of four portions: a control/address portion 174, an additional optional control portion 176, an information portion 178, and an end flag portion 180. The exemplifying frame format shown in FIG. 6 is only one of many frame formats and a plurality of frame formats can be developed, such as, for example, by the simple rearrangement of the portions within the frame, the simple re-arrangement of the bits within the portions or by the addition or removal of bits or portions.

The QMIP 110B is configure to receive information from each of the functional modules 104A–104N. Typically, the QMIP 110B comprises one or more memory queues which are used to store the information from the various functional modules as it arrives. The basic functions disclosed in FIG. 5 assume that the information has already been received by the QMIP 110B and placed within a queue. Either the queue itself uniquely identifies the functional module from which the information is received, or, alternatively, an entry in the queue indicates from which of the functional modules the information is received. As noted above, the functional modules operate transparently to the operation of the QMIP 110B and, therefore, in some cases may not self-identify themselves within the information.

In block 120, the QMIP 110B retrieves information from the queue corresponding to one of the functional modules 104. In block 122, the QMIP 110 determines whether the functional module 104 is able to accept data. As noted above, the QMIP 110B facilitates bi-directional communication over the serial link 74. Typically, one or more of the functional modules 104 utilizes flow control for data reception. For example, if the data services functional module 104C is receiving data from the TCP/IP stack application module 108B at a rate faster than the data services functional module 104C can queue the data for transmission over the wireless link, periodically the data services functional module 104C exerts a flow control indication intended for the TCP/IP stack to cease the flow of data to the data service functional module 104C. As the stored data within the data service functional module 104C is transmitted over the wireless link, the data services functional module 104C exerts an indication intended for the TCP/IP stack application module 108B indicating that it is once again able to accept data. According to the invention, the flow control information corresponding to data received by the data services functional module 104C can be included in a QMIP frame 172 which also carries information to the corresponding application module 108B. In addition, in some cases, a frame is created which carries control information but does not carry payload data information for transmission to the application module.

Within the frame 172, a flow control bit 188 within the control/address portion is used to implement software flow control on a logical circuit basis. Thus, in one embodiment, when the functional modules 104 send flow control information, the QMIP 110 intercepts the flow control information and queues it for transmission according to the flowchart shown in FIG. 5. In block 122, the QMIP 110B determines whether the corresponding functional module 104 has indicated that it is unable to accept more data by reference to the flow control queue. If the functional module 104 can no longer accept data, the flow control bit 188 is set to 1 as indicated in block 124. If the functional module 104 is able to accept data, the flow control bit 188 is set to 0 as indicated in block 126. In either case, flow continues to block 128.

In block 128, the QMIP 110B determines whether the persistence timer associated with the functional module has expired. If the persistence timer has expired, a poll bit 182 within the control/address portion 174 is set to 1 in block 130. If the persistence timer has not expired, the poll bit 182 is set to 0 in block 132.

The use of the poll bit 182 is designed to prevent deadlock in the following situation. Assume that a functional module 104 notifies the QMIP 110B that it can no longer accept data. The QMIP 110B creates a frame 172 with the flow control bit 188 set to 1. When the corresponding indication is received at the corresponding application module 108, the application module 108 ceases to transmit data to the specified functional module 104 and begins to wait for a frame with a flow control bit set to 0. If the functional module 104 sends an indication to the QMIP 110B that it is able to accept data and the QMIP 110B creates a corresponding frame 172 with the flow control bit 188 set to 0, a deadlock occurs if the frame is lost or corrupted in transmission so that the corresponding application module 108 does not receive the indication. In such a case, the functional module 104 is waiting for data from the application module 108 and the application module 108 is waiting for the indication from the functional module 104 that it is ready for additional data.

In order to prevent this deadlock, according to the invention, when the QMIP 110A receives a frame with a flow control bit set to 1, it sets a corresponding persistence timer associated with either the functional module 104 or the application module 108, alternatively a timer associated with both the functional module 104 and the application module 108. If the timer expires before a frame is received with a flow control bit set equal to 1, the QMIP 110A creates a frame with the poll bit set equal to 1and indicating the address of the corresponding functional module 104. When the QMIP 110B receives the message, if the corresponding functional module 104 is currently capable of receiving data, the QMIP 110B creates a frame 172 with a flow control bit 188 set to 0 indicating that the corresponding functional module is able to accept data.

In block 134, the QMIP 110B determines whether the information or the functional module 104 has a high priority indication. If so, an optional control bit 184 is set to 1 within the block 136. If not, the optional control bit 184 is set to 0 in the block 138. In one embodiment, the additional optional control portion 176 is used to specify a class of service. The high priority frame can receive preferential processing within the QMIP 110A, QMIP 110B, within the destination module or a combination of these.

In block 140, the QMIP 110B determines whether the information is in-band control data. If the application module for which this frame is intended has implemented a special procedure for in-band control, an in-band control bit 186 is set to 1 in block 142. If not, in block 144 the in-band control bit 186 is set to 0 within block 144.

In block 146, the QMIP 110 sets an address field 190 to identify the functional module 104. When the QMIP 110A receives the frame, it uses the address field to determine the proper destination application module 108. For example, the QMIP 110A may determine the proper application module 108 by reference to a look-up table. In another embodiment, the QMIP 110B refers to a look-up table which maps the functional module 104 address to the corresponding application module 108 address and the QMIP 110B sets the address field 190 to the corresponding application module 108 address. In either case, the look-up table can be predetermined by design, determined by a higher level protocol or determined on a virtual circuit basis.

In block 148, the information received from the application module 108, if any, is placed within the information portion 178 of the frame 172. The information portion 178 contains the data that is being communicated from the functional module 104 to the application module 108. In one embodiment, the maximum size of the information field is 36 bits. In one embodiment, any information which corresponds to an ending flag character or escape character is replaced with a 2-byte sequence.

In block 152, the QMIP 110B places an end flag indication in the end flag portion 180. The ending flag delineates the end of the frame. In one embodiment, it consists of an 8-bit binary sequence such as 8E (HEX). The end flag is used by the QMIP 110A to identify the end of a frame.

In one embodiment, an escape character is used to provide data transparency. In one embodiment, it consists of the binary sequence 8D (HEX). The escape character can be used to pass data values which equal the ending flag designation value.

The process of receiving and processing the frames executed by the QMIP 110A basically follows the analogous reverse-process to that shown in FIG. 5. The QMIP 110A receives the frames, parses them to determine the destination, flow control status and other information as described above. In one embodiment, frames with unrecognized control/address portion 174 values are discarded by the receiving QMIP 110A.

By the processes and mechanisms just described, multiple entities can communicate over a common data link while flow control is individually performed according to the abilities and demands of the various entities.

One advantage of the invention is its relative simplicity. The execution of the invention requires minimal processing power. In addition, the code space required to store the processes of the invention is relatively small. These two advantages are important in the smartphone environment where the processing power and memory capacity are limited to reduce cost. In addition, the invention allows for the efficient transfer of data bytes due to the minimal overhead associated with the frame format. The frame is not cluttered with the unnecessary and burdensome overhead content associated with most standard multiplexing protocols. As noted above, one type of data which may be transferred using the QMIP is voice data. Therefore, it is important to limit the amount of delay, especially random delay, caused by the multiplex protocol in order to preserve voice quality. Therefore, by limiting the overhead and, thereby, increasing the data carrying capacity of the band-limited serial link, the invention preserves voice quality. In addition to the rapid transfer of the data over the band-limited serial link, the relatively simple multiplex protocol also creates the frames quite quickly, thereby further decreasing the latency and random delay associated with the multiplex protocol. Each of these considerations allows the invention to be implemented in an inexpensive, time-sensitive, memory-conservative and processing-conservative manner.

The invention may be embodied in other specific forms without departing from its spirit or essential characteristics. The described embodiment can be considered in all respects only as illustrative and not as restrictive, and the scope of the invention is, therefore, indicated by the appended claims rather than by the foregoing description. All changes which come within the meaning and range of equivalency of the claims are to be embraced within their scope.

What is claimed is:

1. A method of communicating between multiple entities over a common data link, comprising:

receiving and storing data information from a first plurality of modules;

receiving and storing a flow control indication from at least one module of a first plurality of modules wherein said flow control indication is indicative of whether said at least one module of said first plurality of modules is capable of receiving data;

creating a frame comprising said data information and said flow control indication corresponding to a first one of said first plurality of modules;

forwarding said frame over said common data link;

receiving said frame at a far end of said common data link;

parsing said flow control indication and said data information from said frame; and forwarding said flow control indication and said data information to a destination module.

2. A digital apparatus, comprising:

a first plurality of modules, each of which has a data input, a data output and a flow control output, wherein at least one of said first plurality of modules is configured to provide a flow control indication at said flow control output if said at least one of said first plurality of modules is unable to accept additional data at said data input;

a first connection module having a transmission input coupled to said data output of each of said first plurality of modules, having a flow control input coupled to said flow control output of said at least one of said first plurality of modules and having a transmission output, wherein said first connection module is configured to receive information from said transmission input and to create a frame comprising said information and said flow control indication corresponding to one of said first plurality of modules and to produce said frame on said transmission output;

a common data link having a first input coupled to said transmission output of said first connection module and having a first output, said common data link configured to pass said frame from said first input to said first output;

a second connection module having a reception input coupled to said first output of said common data link and having a flow control output and a data output, said second connection module configured to parse said frame and to pass said flow control indication and said information from said flow control output and said data output, respectively, to an intended module from a second plurality of modules.

3. The digital apparatus of claim 2, wherein said first plurality of modules are functional modules within a wireless access unit.

4. The digital apparatus of claim 2, wherein said first plurality of modules are application modules within a smartphone.

5. The digital apparatus of claim 2, wherein said first plurality of modules are configured to operate as if a dedicated path connects each of said first plurality of modules to a corresponding one of said second plurality of modules.

6. An apparatus for communicating between multiple entities over a common data link, comprising:

means for receiving and storing data information from a first plurality of modules;

means for receiving and storing a flow control indication from at least one module of a first plurality of modules wherein said flow control indication is indicative of whether said at least one module of said first plurality of modules is capable of receiving data;

means for creating a frame comprising said data information and said flow control indication corresponding to a first one of said first plurality of modules;

means for forwarding said frame over said common data link;

means for receiving said frame at a far end of said common data link;

means for parsing said flow control indication and said data information from said frame; and means for forwarding said flow control indication and said data information to a destination module.

* * * * *